United States Patent [19]
Cavigelli

[11] 3,745,459
[45] July 10, 1973

[54] CONDUCTIVITY MONITOR HAVING CONTROL NETWORK LOAD COMPENSATION

[75] Inventor: George A. Cavigelli, Lexington, Mass.

[73] Assignee: Sybron Corporation, Rochester, N.Y.

[22] Filed: Sept. 14, 1971

[21] Appl. No.: 180,329

[52] U.S. Cl. .............................. 324/157, 324/30 R
[51] Int. Cl. ............................................ G01n 27/42
[58] Field of Search...................... 324/30, 157, 132, 324/130, 115

[56] References Cited
UNITED STATES PATENTS
3,464,012   8/1969   Webb................................. 324/115
3,029,379   4/1962   Ingram................................. 324/30

Primary Examiner—Alfred E. Smith
Attorney—Theodore B. Roessel

[57] ABSTRACT

A conductivity monitor having a sensing network including a conductivity cell and an ammeter, and a control network including a relay which is energized when current in the sensing network exceeds a certain value, is provided with a load network connected in parallel to the sensing and control networks. The load network has an average impedance substantially equal to the average impedance of the control network and includes a switch operated by the relay that switches the load network from a conductive to a non-conductive state when the relay is energized. As a result the meter reading is not affected when the relay is energized.

The preferred control network has a capacitor wired in parallel with the relay between the cathode of a rectifier and the anode of an electronic switch. The impedance of this network varies cyclically and provides hysteresis for stable operation.

6 Claims, 2 Drawing Figures

PATENTED JUL 10 1973 3,745,459

INVENTOR.
GEORGE A. CAVIGELLI
BY
*Theodore B Roesel*
ATTORNEY

CONDUCTIVITY MONITOR HAVING CONTROL NETWORK LOAD COMPENSATION

BACKGROUND OF THE INVENTION

This invention relates to a condition responsive control circuit and more particularly to a circuit for a conductivity monitor.

Certain fluid treating processes, such as water distillation and demineralization, are controlled by monitoring the conductivity of the fluid produced. Typically, when the conductivity exceeds a certain level an alarm is sounded and/or process controls are activated to bring the conductivity back within a desired range. In addition, conductivity monitors are usually provided with indicating means such as ammeters so that the conductivity and/or the purity of the fluid being monitored can be readily ascertained.

SUMMARY OF THE INVENTION

It is an object of this invention to provide a condition responsive control circuit including indicating means and a control element such as a relay in which the reading of the indicator is not affected when the control element is energized. This is accomplished by providing a circuit having a sensing network, a control network and a load network connected in parallel to a suitable source of current such as a transformer. The sensing network includes a sensor, such as a conductivity cell, which causes a current proportional to the condition being sensed to flow through the sensing network, and indicating means, such as an ammeter, which produces a signal proportional to the current in the sensing network. The control network includes a control element, such as a relay, adapted to control a second circuit that operates an alarm, process controls or the like; and also includes switching means adapted to energize the control element when the current in the sensing network exceeds a certain value.

Since the control network and the sensing network are connected to the same source of current, energizing the control element without making any other changes would normally increase the total load on this source, which in turn would decrease the current flowing through the sensing network and the signal produced by the indicating means. However, this effect is compensated for, or nullified, by the load network, which has an impedance effectively equal to the impedance of the control network and includes means for switching the load network from a conductive state to a nonconductive state when the control element is energized. Removing the load impedance from the circuit compensates for energizing the control element. Thus, as long as the condition being sensed remains the same, the effective load on the source of current and the reading of the indicator are not affected when the control element is energized.

In the preferred embodiment of this invention the control element is a relay and the switching means in the control network which energizes the relay is an electronic switch. The relay and a capacitor are connected in parallel between the anode of the electronic switch and the cathode of a rectifier. The impedance of this network varies cyclically so that the average current in the sensing network must decrease below the turn-on level in order to de-energize the relay. This hystersis provides stable operation and prevents chattering of the relay.

Other objects and advantages of this invention will be apparent from the following description.

DRAWINGS

DETAILED DESCRIPTION

Figure 1:
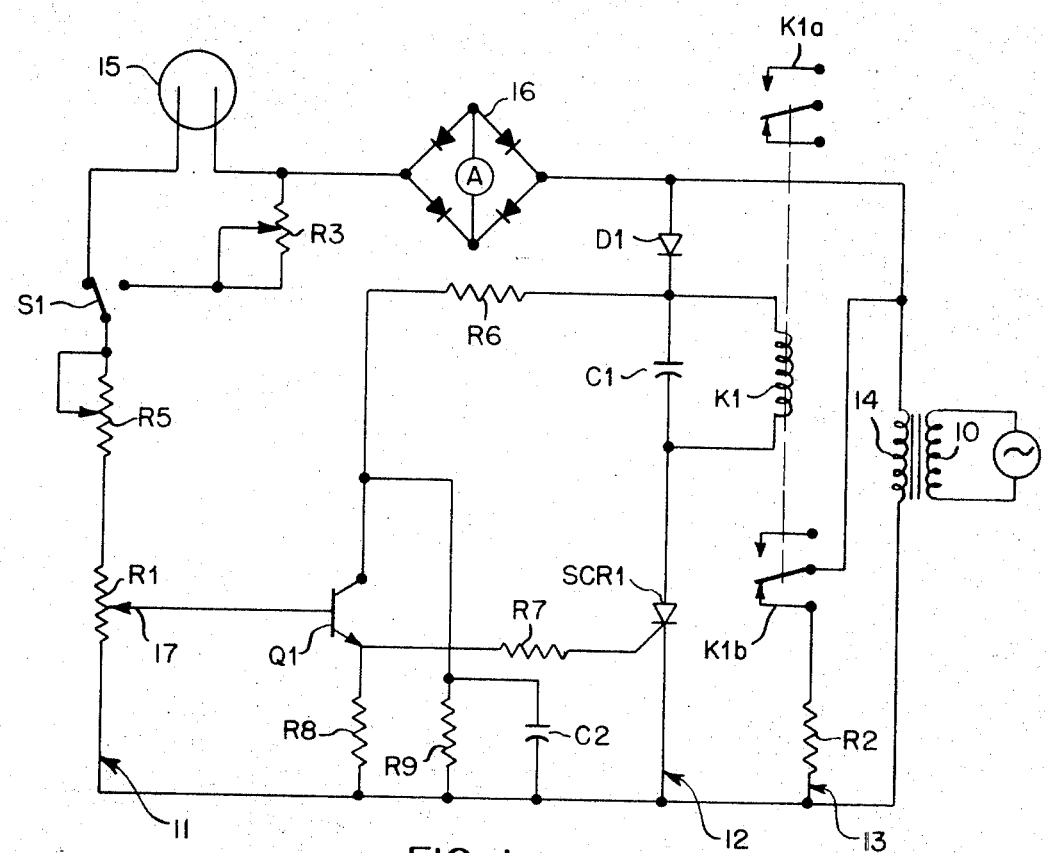
FIG. 1 is a diagram of an embodiment of this invention adapted to monitor the conductivity of distilled or demineralized water.

Referring to FIG. 1, 115-volt 60 cycle alternating current is supplied to the primary winding 10 of a transformer. A sensing network 11, a control network 12 and a load network 13 are connected in parallel to the secondary 14 of the transformer.

Figure 2:
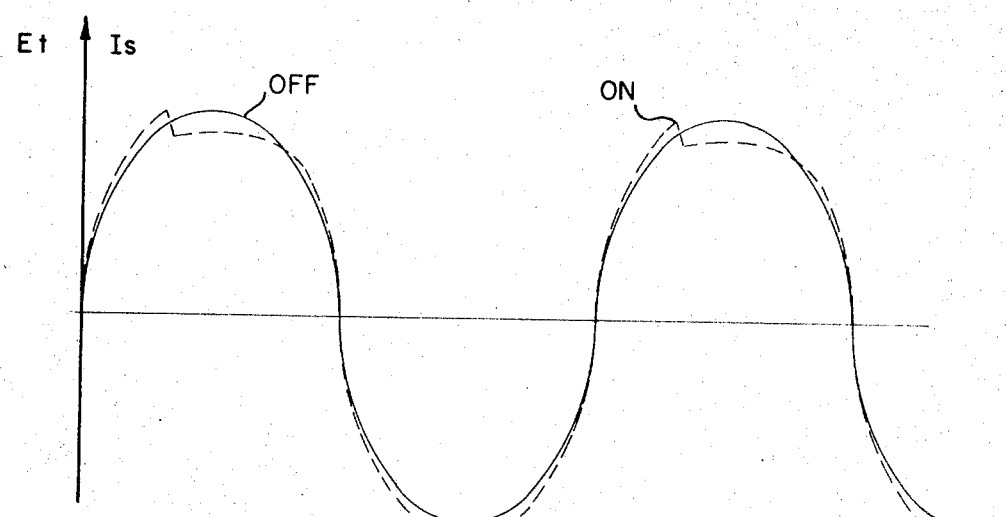
FIG. 2 is a plot of the transformer output voltage and/or sensing network current of the circuit in FIG. 1, showing the voltage and current for both states of the circuit.

Sensing network 11 includes a conductivity cell 15 and an average current reading ammeter 16 which is calibrated to produce a direct reading of the conductivity and the purity of the fluid passing through cell 15. As the purity of the water passing through cell 15 decreases, the resistance across the cell decreases and the current in the sensing network increases. A voltage proportional to the current in the sensing network is developed across potentiometer R1. This signal is amplified through the current gain of transistor Q1 and is used to turn on the gate of a silicon controlled rectifier SCR1 in the control network 12. When SCR1 conducts, relay K1 is energized and through one of its contacts K1$a$ an alarm, process controls or the like (not shown) in a second circuit are activated. Relay K1 also operates a normally closed switch K1$b$ in the load network and thereby disconnects a loading resistance R2 from the transformer secondary. The effect of this is shown in FIG. 2, which is a curve of the transformer output voltage $E_t$ and/or the sensing loop current $I_s$. The solid line shows the voltage and current when the monitor is "off," i.e., when the relay coil is not energized, while the dotted line shows the voltage and current when the relay is energized.

When the sensing loop current goes above the set point and SCR1 conducts, for a short period of time during the positive half cycle of the transformer output voltage, a significant current is required to charge capacitor C1, which is connected in parallel with relay K1 between the cathode of diode D1 and the anode of the silicon controlled rectifier SCR1. During this portion of each cycle the impedance of the control network 12 drops below the impedance of R2, thus the load on the transformer increases and the transformer output voltage and the sensing loop current decrease. However, during the portion of each cycle when the silicon controlled rectifier SCR1 is not conducting, the control network becomes in effect an infinite impedance.

While the monitor is "on," capacitor C1 holds the relay K1 in during the portion of each cycle when the silicon controlled rectifier SCR1 is not conducting. Thus, resistor R2 remains disconnected and the transformer output voltage and sensing loop current vary as shown by the dotted line in FIG. 2, i.e., dropping below what they were before the relay was energized each time SCR1 conducts and then rising above what they were before the relay was energized for the portion of each cycle when SCR1 is not conducting.

Resistor R2 is chosen to provide an impedance substantially equal to the average impedance of control network 12. As a result, the average transformer output voltage and the average sensing loop current are independent of the state of the monitor, i.e., they are the same regardless of whether or not the relay is energized. Since the reading of ammeter 16 is proportional to the average sensing loop current it remains the same whether or not the relay is energized. However, because the voltage and the sensing loop current increase when the silicon controlled rectifier is not conducting but the relay is energized, the average current in the sensing loop must fall below the "turn-on" level to de-energize the relay. This hysteresis effect provides stable operation and prevents chattering of the relay.

The point at which the relay is energized is set by adjusting the slide 17 of potentiometer R1. This adjustment is facilitated by another potentiometer R3 which may be connected in the circuit in place of conductivity cell 15 by changing switch S1. Potentiometer R3 is adjusted until the reading on meter 16, which is calibrated to indicate both the resistivity of the fluid in the cell in megohm-cms and the purity of the fluid in parts per million of sodium chloride in the fluid, is at the desired set point. Potentiometer R1 is then adjusted until the relay K1 operates at this point.

The sensing network also includes a potentiometer R5 for calibrating the meter. A known resistance is connected across the electrodes of conductivity cell 15 and potentiometer R5 is adjusted until the meter reading corresponds to the known resistnace.

Resistors R6, R7, R8, and R9 and capacitor C2 form a voltage divider network which biases Q1. This network, which is conventional and forms no part of the present invention, may be replaced by a number of similar circuits.

A set of component values that has been found satisfactory for use in the circuit shown in FIG. 1 is set forth below.

R1 . . . 0–15 Kilohms
R2 . . . 10 Kilohms
R3 . . . 0–2 Megohms
R5 . . . 0–150 Kilohms
R6 . . . 15 Kilohms
R7 . . . 150 ohms
R8 . . . 1 Kilohm
R9 . . . 3.3 Kilohms
K1 . . . Potter & Brumfield KUP11D15 110V DC
C1 . . . 15 Microfarads
C2 . . . 10 Microfarads
D1 . . . 1N3254
SCR1 . . . GE C106B1
Q1 . . . 2N3860
Transformer 115 V AC primary, 115 V AC secondary This circuit is designed so that the set point may be varied to operate the relay K1 when the apparent resistance of the fluid passing through the conductivity cell is somewhere between about 50 kilohms and about 2 megohms.

The circuit described above is merely illustrative of one embodiment of this invention, and a variety of modifications will be readily apparent to one skilled in the art. For example, if the current to be detected is larger than the gate trigger current of the silicon controlled rectifier SCR1, the transistor Q1 and the associated biasing voltage divider network may be omitted. Similarly, an indicator which produces a signal proportional to something other than the average current in the sensing network, such as an RMS current reading ammeter, may be used if appropriate adjustments are made in the load impedance. A variety of other modifications may be made to the circuit described above within the scope of this invention, which is defined by the appended claims.

I claim:

1. A condition responsive contrOl circuit comprising:
   a. a sensing network comprising:
      i. a sensor adapted to cause a current proportional to the condition being sensed to flow through the sensing network, and
      ii. indicating means for producing a signal porportional to the current in the sensing network;
   b. a control network parallel to said sensing network, said control network comprising a control element and switching means for energizing the control element in response to current in the sensing network;
   c. a load network parallel to said sensing and said control networks, said load network having an impedance effectively equal to the impedance of the control network and including means for switching the load network from a conductive to a non-conductive state when said control element is energized;
   d. said sensing network, control network, and load network being connected in parallel to a source of current, whereby the effective load on said source and the signal produced by said indicating means are not affected when said control element is energized.

2. A circuit according to claim 1 wherein the indicating means comprises an average current reading ammeter and the average impedance of the load network is substantially equal to the average impedance of the control network.

3. A circuit according to claim 1 wherein the control element comprises a relay, the switching means in the control network comprises an electronic switch, and the control network further comprises a capacitor, said capacitor and said relay being connected in parallel between the source of current and the anode of said electronic switch.

4. A circuit according to claim 1 wherein said source of current comprises a transformer.

5. A circuit according to claim 1 wherein said sensor comprises a conductivity cell.

6. A circuit for a conductivity monitor comprising:
   a. a sensing network comprising a conductivity cell and an average current reading ammeter connected in series;
   b. a control network comprising a rectifier, a relay, a capacitor and a silicon controlled rectifier, said capacitor and said relay being connected in parallel between the cathode of said rectifier and the anode of said silicon controlled rectifier;
   c. a load network comprising a resistor whose impedance is substantially equal to the average impedance of said control network and a normally closed switch that opens when said relay is energized; and
   d. a transformer; said sensing network, control network, and load network being connected in parallel to the secondary winding of the transformer.

* * * * *